Figure 4:
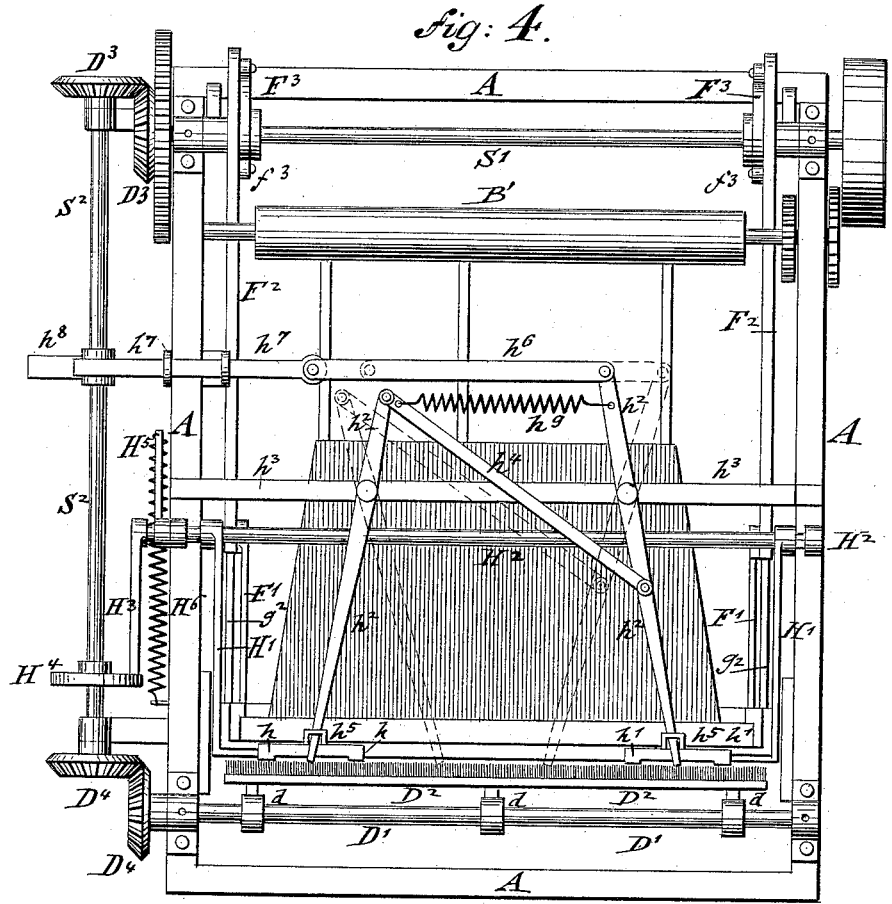

(No Model.) 3 Sheets—Sheet 1.
J. W. SUTTON.
MACHINE FOR PLUCKING FURS.
No. 383,258. Patented May 22, 1888.
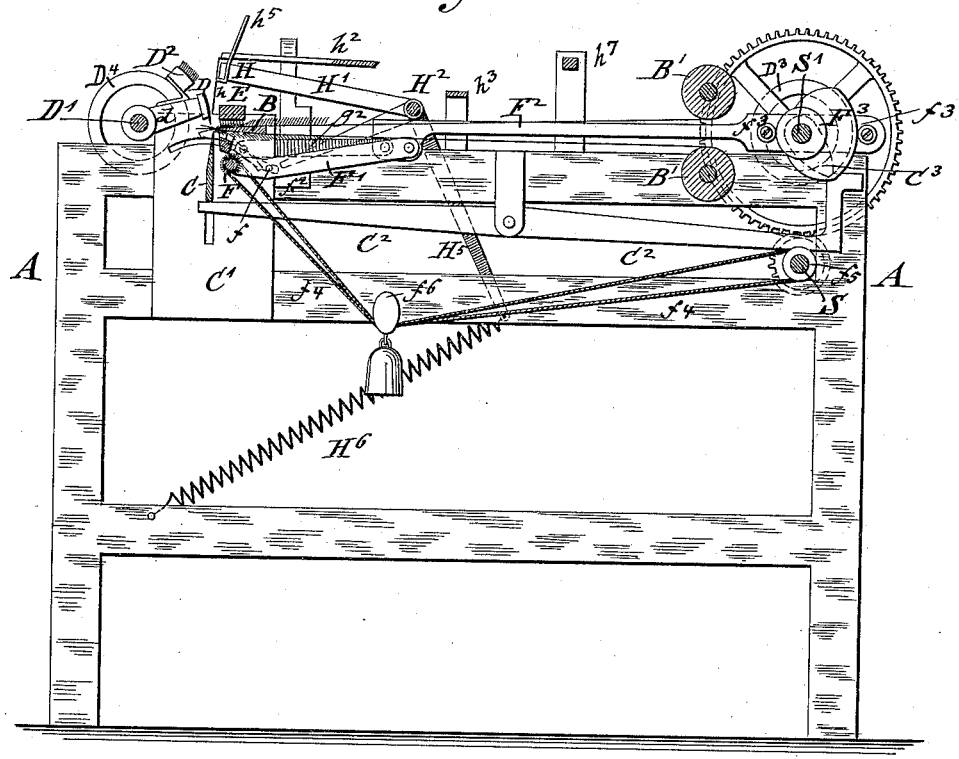
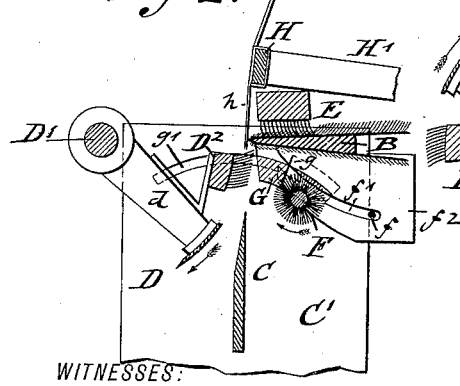
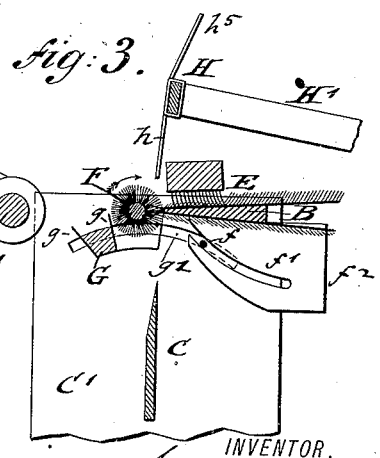
WITNESSES:
A. Schehl.
Martin Petry.
INVENTOR.
John W. Sutton.
BY
Goepel & Raegener,
ATTORNEYS.

(No Model.) 3 Sheets—Sheet 2.

J. W. SUTTON.
MACHINE FOR PLUCKING FURS.

No. 383,258. Patented May 22, 1888.

WITNESSES:
A. Schehl.
Martin Petry.

INVENTOR
John W. Sutton
BY
Jacques Raegener
ATTORNEYS.

(No Model.) 3 Sheets—Sheet 3.
J. W. SUTTON.
MACHINE FOR PLUCKING FURS.
No. 383,258. Patented May 22, 1888.
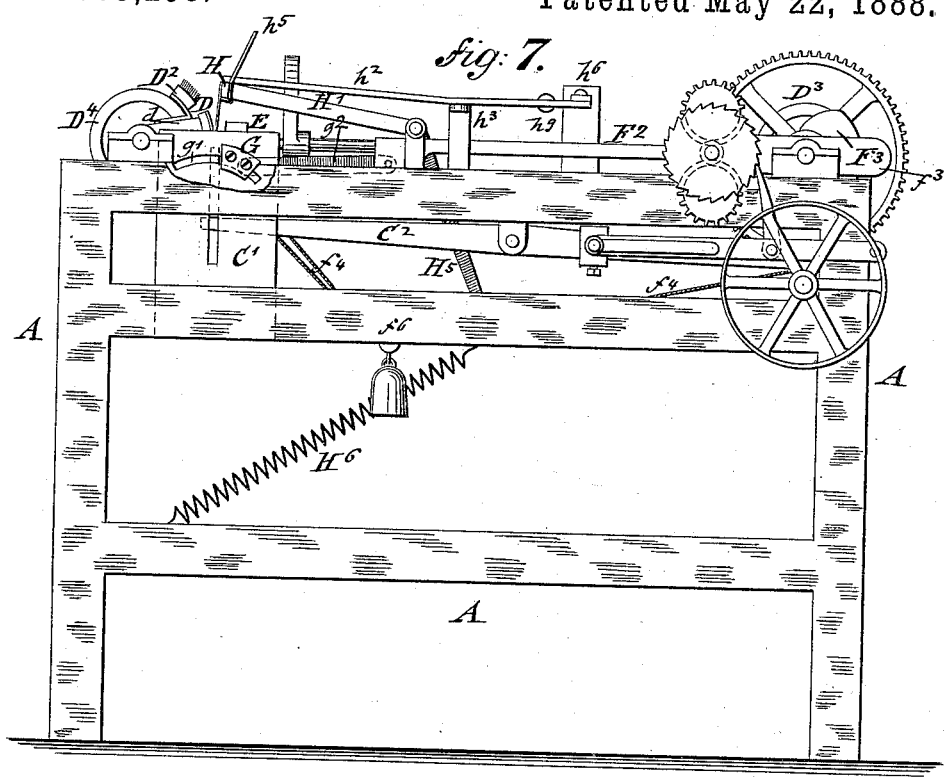
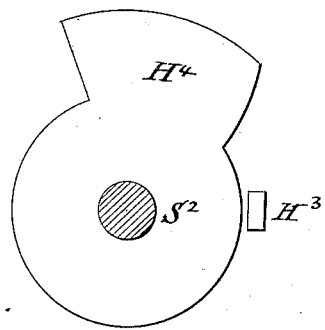
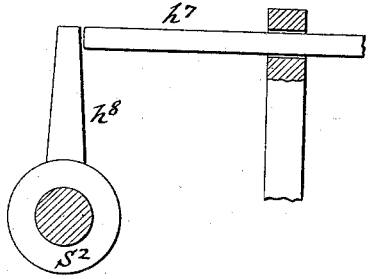
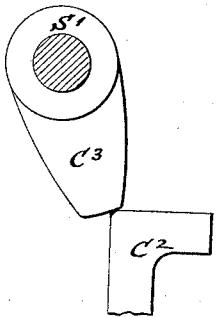
WITNESSES:
A. Schehl.
Martin Petry.
INVENTOR
John W. Sutton
BY
Goepel & Raegener
ATTORNEYS.

UNITED STATES PATENT OFFICE.

JOHN W. SUTTON, OF NEW YORK, N. Y.

MACHINE FOR PLUCKING FURS.

SPECIFICATION forming part of Letters Patent No. 383,258, dated May 22, 1888.

Application filed May 13, 1887. Renewed March 2, 1888. Serial No. 266,007. (No model.)

*To all whom it may concern:*

Be it known that I, JOHN W. SUTTON, of the city, county, and State of New York, have invented certain new and useful Improvements in Machines for Plucking Furs, of which the following is a specification.

This invention relates to an improved machine for plucking sealskins and other furs, so as to remove the stiff water-hair therefrom without injuring the soft hair or wool of the same.

The machine is more especially designed with a view to overcome some of the defects and insufficiencies of the plucking-machines heretofore in use, and produce the plucking of the skins at the lower parts of the neck and shoulders, where the hairs point outwardly and backwardly and are the most difficult to pluck, as they lie down close to the skin when the same is drawn over the stretcher-bar.

My invention is further designed to dispense with a blast-fan or other air-forcing devices, and produce the removing of the water-hairs entirely by mechanical means, which are operated by power, so that a quick and uniform plucking of the skin takes place.

The invention consists of a machine for plucking seal and other skins, which comprises a fixed stretcher-bar, means for stretching and intermittently feeding the skin over said stretcher-bar, a fixed card above the stretcher-bar near the edge of the same, a rotary separating-brush that is intermittently moved up in front of the stretcher-bar, an oscillating guard below the stretcher-bar, a rotary cutting-knife and a vertically-reciprocating cutting-knife working in conjunction with the rotary knife for cutting off the stiff projecting hairs, said rotary cutting-knife being provided with a card supported back of the knife, all of which parts are operated from a common driving-shaft, so as to produce for each rotation of the same the cutting off or plucking of the hairs projecting from that part of the skin in front of the stretcher-bar.

The invention consists, further, of the combination, with the elements described, of laterally-reciprocating rubbers which are guided on an oscillating supporting-bar, said rubbers being quickly moved inward over the skin in front of the stretcher-bar and then lifted and returned to their normal position, so as to raise the hairs that lie down close to the skin and present them for the cutting action of the knives.

The invention consists, further, of the mechanisms by which the motion is imparted from the driving-shaft to the different parts comprising the machine, as will appear more fully hereinafter, and finally be pointed out in the claims.

Figure 5:
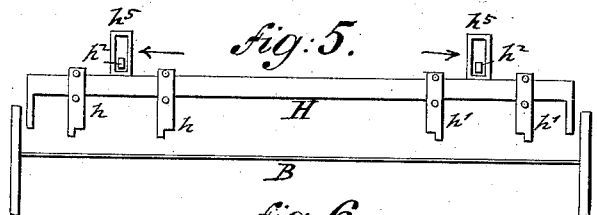
Figure 6:
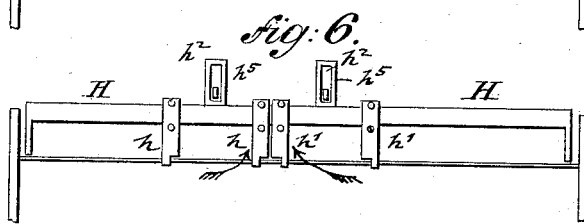

In the accompanying drawings, Figure 1 represents a vertical longitudinal section of my improved machine for plucking sealskins and other furs, the machine being shown in the act of cutting the stiff hairs projecting in front of the stretcher-bar. Figs. 2 and 3 are vertical longitudinal sections of the operative parts of the machine, drawn on a larger scale, and showing them respectively in the act of running over the edge of the skin and brushing the stiff hairs forward, said figures representing different stages in the treatment of the skin preparatory to the cutting off of the hairs. Fig. 4 is a plan of my improved machine. Figs. 5 and 6 are detail front views of the devices for rubbing over the edge of the skin, the figures showing the rubbers respectively in position before and during the rubbing action. Fig. 7 is a side elevation of the machine, with a part of the supporting-frame broken away; and Figs. 8, 9, and 10 are details of the different cams by which motion is imparted to the working parts of the machine.

Similar letters of reference indicate corresponding parts.

Referring to the drawings, A represents the supporting-frame of my improved machine for plucking seal and other skins. On the frame A is supported a fixed transverse stretcher-bar, B, which is tapered to a narrow edge, over which the skin to be plucked is stretched. The skin is applied by tapes to the rollers B' B', which are intermittently actuated by gear-wheels operated by a pawl and ratchet-wheel mechanism from the driving-shaft S, as customary in plucking-machines of this class. By the gear-wheels and the pawl-and-ratchet mechanism the skin is fed intermittently for a small portion of its length over the front edge of the stretcher-bar, it being unwound from the upper and wound up on the lower feed-roller. Below the edge of the stretcher-bar is arranged a vertically-reciprocating knife, C, which moves in slots or ways of fixed guide-plates C', and which is operated by fulcrumed levers C², the rear ends of which are engaged by cams C³ on a cam-shaft, S', that is supported above the driving-shaft S in suitable bearings of the frame A, as shown in Figs. 1 and 10.

In front of and at some distance from the stretcher-bar B is supported a shaft, D', in bearings of the frame A, said shaft being provided with radial arms $d\ d$, to which the rotary knife D is attached, which, in conjunction with the vertically-reciprocating knife C, serves to cut off the water-hairs projecting from that part of the skin in front of the edge of the stretcher-bar B. To the arms of the rotary knife D, and at some distance back of the latter, is applied a carding-brush, D², which acts on that part of the skin that is fed forward over the edge of the stretcher-bar immediately after the hairs of the next preceding section of the skin have been cut off. The shaft D' of the cutting-knife D is rotated from the cam-shaft S', by means of an intermediate longitudinal shaft, S², and two sets of miter-wheels, D³ D⁴, as shown clearly in Fig. 4.

Immediately above the stretcher-bar B is arranged a stationary card, E, which is attached to the ends of the stretcher-bar B by means of thumb screws. (Not shown in the drawings.) The points of the teeth of the card E are close to but do not touch the surface of the skin, so that the hair and fur are both straightened as the skin is fed forward. The teeth of the card E hold down the fine fur, but permit the stiff hairs to stand up between the teeth, owing to the slow forward movement of the skin, which gives the hairs sufficient time to so adjust themselves.

Below the stretcher-bar B is arranged a rotary separating-brush, F, which is supported in oscillating arms F', that are guided by pins $f$ in arc-shaped slots $f'$ of fixed guide-plates $f^2$, as shown clearly in Figs. 1, 2, and 3, the oscillating arms F' being pivoted to horizontally-reciprocating connecting-rods F², which are provided with yokes $f^3$, having anti-friction rollers at their rear ends and acted upon by cams F³ on the cam-shaft S', the cams being so shaped and timed that the forward and upward motion of the brush F takes place at the proper time.

The brush F receives rotary motion from two belts, $f^4$, which pass over pulleys $f^5$ on the shaft S' and the brush-shaft, and which are kept taut by weighted idlers $f^6$, as shown clearly in Fig. 1.

The brush F is made of soft bristles and is rotated at a speed of one hundred and fifty revolutions per minute. The soft bristles allow the stiff hairs to stand, while the quick motion of the brush bends the soft hair in downward direction and brushes it below the stretcher-bar, so that it can be taken up and held in position by the soft-rubber wipers $g$ of an oscillating guard-bar, G, which moves in arc-shaped slots $g'$ of the guide-plates C'. The guard G receives oscillating motion by pivot-links $g^2$ from the connecting-rods F² of the separating-brush F, as shown in Figs. 1 and 7. A guide-bar, H, is supported on arms H' at some distance above the stretcher-bar, said arms being applied to a transverse shaft, H², which shaft is oscillated by means of an arm, H³, that is engaged by a cam, H⁴, on the longitudinal shaft S². (Shown in Figs. 4 and 8.) A second downwardly-extending arm, H⁵, on the shaft H² is connected by a spring, H⁶, to the supporting-frame, said spring returning the guide-bar H to its normally-raised position as soon as the action of the cam H⁴ on the arm H⁵ has been completed. On the guide-bar H are supported two pairs of laterally-reciprocating rubbers, $h\ h'$, which are guided on said bar and quickly moved over the same by means of oscillating levers $h^2$, that are fulcrumed to a transverse bar, $h^3$, of the supporting-frame H and connected by a link, $h^4$, that is pivoted to one lever $h^2$ in front of its fulcrum and back of the fulcrum of the other lever $h^2$, as shown in Fig. 4. The front ends of the levers $h^2$ engage slotted and slightly-inclined keepers $h^5$ of each pair of rubbers $h\ h'$. The rear end of one of the levers $h^2$ is connected by a pivot-rod, $h^6$, with a laterally-guided rod, $h^7$, that is intermittently actuated by a cam, $h^8$, on the longitudinal shaft S², (shown in detail in Fig. 9,) said cam producing the motion of the levers $h^2$ and rubbers $h\ h'$ toward each other into the positions shown in dotted lines in Fig. 4, while a spiral spring, $h^9$, that connects the rear ends of the levers $h^2$, quickly returns the lever $h^2$ and rubbers $h\ h'$ to their normal positions as soon as the cam $h^8$ has completed its work.

By the combined oscillating motion of the guide-bar H, as produced by the cam H⁴, (shown in Fig. 8,) and the laterally-reciprocating motion of the rubbers $h\ h'$, produced by the cam $h^8$, (shown in Fig. 9,) the rubbers $h\ h'$ are quickly passed over that part of the skin in front of the stretcher-bar, so that the stiff hairs that lie down close to the skin at the portion around the neck and shoulders of the same are raised and presented to the action of the cutting-knives. When the rubbers $h\ h'$ arrive at their innermost positions, as shown in Fig. 6, the guide-bar H is raised and simultaneously the rubbers $h\ h'$ returned to their former positions by the levers $h^2$ and spring $h^9$.

The operation of the machine is as follows: The skin is placed in the machine by being attached to the feed-rollers and drawn tightly over the edge of the stretcher-bar, so as to lie close to the upper and lower surface of the same. The skin is put in in such a manner that the head end is foremost. The stiff hairs in sealskins point toward the tail, except at the lower part of the neck and shoulders. These parts are at the sides of the head end of the skin, as the skin is split open at the under side. At these parts of the skin the hairs point outwardly and backwardly and are the most troublesome to cut or pluck, as they lie down close to the skin when it is drawn over the stretcher-bar. A sharp and quick rub over these parts of the skin from the edge toward the center of the skin is therefore necessary, so as to straighten up the hairs and present them to the action of the cutting-knives. When the skin is in place, the stationary card E is drawn backward a few times over that part of the skin that is upon the stretcher-bar B, so as to card back the fur and hair and produce thereby a parting of the fur at that part of the skin then covering the edge of the stretcher-bar. One half of the fur upon that section of the skin will by the parting be kept above and the other half below the edge of the stretcher-bar. This permits the hair upon that section of the skin in front of the edge of the stretcher-bar to rise through the fur and keep its place with less trouble than when more fur is acted upon. When the fur and hair have been carded back by the card E, the same is fastened to the stretcher-bar by thumb screws. The card is set back from the edge of the stretcher-bar to a distance a little more than one-half of the length of the fur for the purpose of holding the fur and preventing it from moving forward until the forward motion of the skin takes place. The card at the back of the rotary knife passes then over the skin in front of the edge of the stretcher-bar and draws out all the fur and hair on that section, so that the fur and hairs so drawn out assume their natural positions—that is, the positions which they would have if the skin were drawn over the edge of the stretcher-bar without anything for holding back the fur and hair. As soon as the card at the back of the rotary knife has passed over the section of the skin in front of the stretcher-bar the rubbers are quickly moved over the same toward the center, whereby the hairs that lie down sidewise are raised and pointed outwardly, causing them to stand upright. The rotary separating-brush is then quickly moved upward and forward and revolved in front of the skin at the edge of the stretcher-bar, so as to separate the fur from the hairs, brushing down the former and leaving the stiff hair standing out. The rotary separating-brush is then quickly moved backward and downward, so as to carry with it the separated fur, which is then held in position by the oscillating guard that follows the brush and carries the fur still farther back and holds it in position, while the vertical knife is raised and shears off, in conjunction with the rotary knife, the forward-projecting hairs, as shown in Fig. 1. The separating-brush, after it has accomplished its work, is lowered sufficiently so as not to touch the skin at all, except when it is in front of the working-edge of the stretcher-bar. The next section of the skin is now moved by the feed rollers over the edge of the stretcher-bar and the same operation of the parts produced by the next rotation of the driving-shaft, and so on until the skin is finished. When the plucking of the skin at the neck and shoulders has been accomplished, the action of the rubbers may be dispensed with, which is accomplished by loosening the cams $H^4 h^8$ on the shaft $S^2$, so that the guide-bar H and the rubbers $h\ h'$ are not acted upon by the transmitting mechanisms and held in a position of rest.

The operation of the machine is quick and reliable, the hair being cut off close to the skin and without injury to the fur, which is held back so as not to be presented to the knives by the action of the stationary card above and the joint action of the separating-brush and oscillating guard below the stretcher-bar.

Having thus described my invention, I claim as new and desire to secure by Letters Patent—

1. The combination of a fixed stretcher-bar, means for intermittently feeding the skin over said stretcher-bar, a stationary card above said stretcher-bar, and a vertically-reciprocating knife and a rotary knife, substantially as set forth.

2. The combination of a fixed stretcher-bar, means for intermittently feeding the skin over said stretcher-bar, a stationary card above the stretcher-bar, a vertically-reciprocating knife, a rotary knife, and a card applied to arms of the rotary knife back of the same, substantially as set forth.

3. The combination of a fixed stretcher-bar, means for stretching and intermittently feeding the skin over said stretcher-bar, a stationary card above said stretcher-bar, a rotary separating-brush below the stretcher-bar, mechanism for moving said brush in front of the stretcher-bar at the proper moment, an oscillating guard below the stretcher-bar, and a vertically-reciprocating knife and a rotary cutting-knife, substantially as set forth.

4. The combination of a fixed stretcher-bar, means for intermittently feeding the skin over said bar, a stationary card above the stretcher-bar, vertically-oscillating and laterally-reciprocating rubbers moving in front of the edge of the stretcher-bar, a rotary separating-brush, an oscillating guard below the stretcher-bar, and a vertically-reciprocating knife and a rotary cutting-knife, substantially as set forth.

5. The combination of a fixed stretcher-bar, means for intermittently feeding the skin over said bar, a stationary card above said stretcher-bar, an oscillating guide-bar, laterally-reciprocating rubbers on said guide-bar, a rotary separating-brush, an oscillating guard, and a vertically-reciprocating knife and a rotary knife, substantially as set forth.

6. The combination of a fixed stretcher-bar, means for intermittently feeding the skin over said bar, a stationary card above said bar, an oscillating guide-bar, and laterally-reciprocating rubbers on said guide-bar, substantially as set forth.

7. The combination of a fixed stretcher-bar, means for intermittently feeding the skin over the same, a guide-bar above the stretcher-bar, means for oscillating said bar, two pairs of rubbers guided on said bar, and means for imparting laterally-reciprocating motion to said rubbers, substantially as set forth.

8. The combination of a fixed stretcher-bar, means for intermittently feeding the skin over the same, a stationary card above the stretcher-bar, a rotary separating-brush below the same, and mechanism, substantially as described, whereby the rotary brush is moved upward and forward into a position in front of the stretcher-bar, substantially as set forth.

9. The combination of a fixed stretcher-bar, means for feeding the skin intermittently over the same, a fixed card above the stretcher-bar, a rotary separating-brush, pivoted arms for said brush, slotted guide-plates for said arms, connecting-rods having cam-yokes, and a driving-shaft having cams, whereby an upward and forward motion is imparted to the rotary separating-brush, substantially as set forth.

10. The combination of a fixed stretcher-bar, means for feeding the skin over the same, a stationary card above the stretcher-bar, a rotary brush below the same, mechanism for moving the brush forward and in front of the stretcher-bar, an oscillating guard having wipers, guide-plates having arc-shaped slots for said guard, pivot-links attached to the guard, connecting-rods having cam-yokes, and a driving-shaft having cams for engaging said cam-yokes, substantially as set forth.

11. The combination of a fixed stretcher-bar, B, an oscillating guide-bar, H, above the same, a shaft, $H^2$, having arms $H^3$ $H^5$, a spring, $H^6$, rubbers $h$ $h'$, having slotted keepers $h^5$, fulcrumed arms $h^2$, connecting-link $h^4$, spring $h^9$, rods $h^6$ $h^7$, and shaft $S^2$, having cams $H^4$ and $h^8$, substantially as set forth.

In testimony that I claim the foregoing as my invention I have signed my name in presence of two subscribing witnesses.

JOHN W. SUTTON.

Witnesses:
PAUL GOEPEL,
CARL KARP.